A. HIGLEY.
Car Brake.

No. 101,874. Patented April 12, 1870.

Witnesses:
J. H. Burridge
D. L. Humphrey

Inventor:
A. Higley

United States Patent Office.

AARON HIGLEY, OF CLEVELAND, OHIO.

Letters Patent No. 101,874, dated April 12, 1870.

IMPROVEMENT IN RAILWAY-CAR BRAKES.

The Schedule referred to in these Letters Patent and making part of the same.

*To all whom it may concern:*

Be it known that I, AARON HIGLEY, of Cleveland, in the county of Cuyahoga and State of Ohio, have invented certain new and useful Improvements in Railroad-Car Brakes; and I do hereby declare that the following is a full and complete description of the same, reference being had to the accompanying drawings making part of this specification.

Objective.

This invention has for its object a car-brake, the construction and application of which being such that it does not act directly upon the wheels of the car, but upon the axles of the wheels, as hereinafter more fully described.

Drawings.

Figure 1:
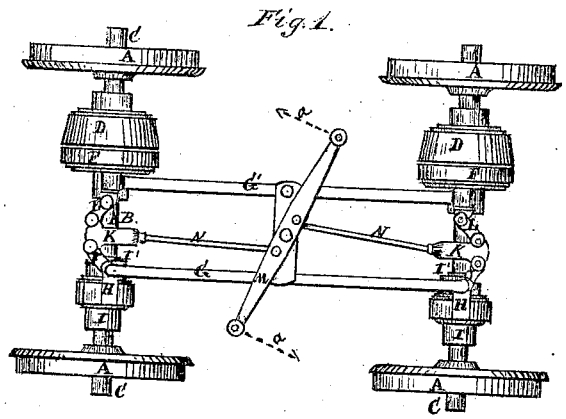
Figure 2:
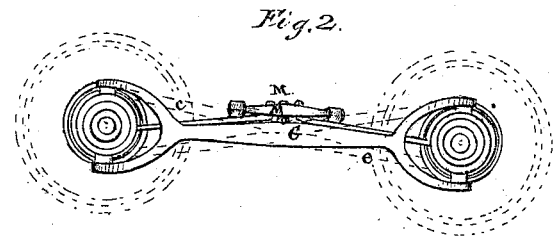
Figure 3:
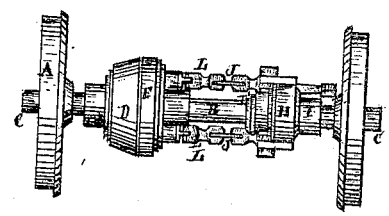
Figure 4:
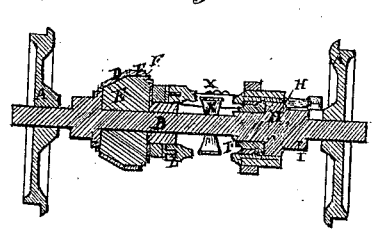
Figure 5:
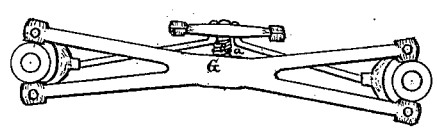

Figure 1 is a top view of a car truck and brake.
Figure 2 a side view.
Figure 3, an end view.
Figure 4, a transverse section.
Figure 5, a detached section.

Like letters of reference refer to like parts in the different views.

Description.

In fig. 1—

A represents the wheels of the truck, secured in a rigid manner to the axles B, and of which C are the bearings or journals.

D is a conical shell, which is also connected to the axle in a rigid, permanent manner, and revolves conjointly therewith.

In said shell is fitted a wooden core, E, fig. 4, the base of which is secured to a deep-flanged disk, F, in which it is fitted, and attached thereby to the axle in a free manner, so that, as the axle and shell revolve, the core remains stationary, but susceptible of a lateral movement.

A shell and core as thus constructed are placed upon each axle, and the cores are connected to each other by the brace G', the bifurcated ends of which are attached to the disks of the cores, thereby holding them from revolving with their axles in a secure and rigid manner.

The bifurcated ends of the brace G are attached to the axles by means of a yoke, H, in which the axle turns.

Said yoke is prevented from sliding laterally upon the axles by means of a pair of collars, I I', secured rigidly to the axle, and between which the yoke is placed, as shown in figs. 1 and 3.

To each side of the yoke, above and below the axle, is pivoted one end of a short link, J, while the opposite end is pivoted to a bail, K; also a similar pair of links, L, is pivoted to the disk F of the core, and to the bail in like manner.

The core and yoke on each axle are alike provided with an arrangement of links and bail, whereby they are operated by means of the lever M, fig. 1, connected therewith by means of the rods N.

By the arrangement of the yokes H H and collars I I', the lateral thrust of the core E and the connecting-links is arrested in connecting and disconnecting the brakes.

As the yoke has no lateral movement between the collars I I', it follows that the core will have a positive lateral movement by the action of the links J L and bails K, in forcing the core into and out of contact with the shell D, and holding it in proper position when the brake is either on or off.

Having thus described the construction and arrangement of the brake, the practical operation of the same is as follows:

It will be obvious that, on turning the lever M in the direction of the dotted lines *a*, fig. 1, the several links J L will be drawn by the rods N to an approximate line with the axles.

Now, inasmuch as the yokes H cannot be moved laterally, in consequence of being placed between the rigid collars I I', the disk and core, being free on the axle, will therefore be moved laterally, and the core thereby driven into the shell with a degree of force proportionate to the power applied to the lever.

The shell being thus closed upon the core, the friction thereby induced will stop the revolution of the wheels and bring the car to a stand still.

The power applied to the lever being relaxed, the lever will return to the position shown by means of the reaction of a spring, *a*, fig. 5, placed immediately under the lever, around the axis of vibration, thereby relieving the core from its contact with and pressure upon the shell. The car will now be free to move forward.

In consequence of the large amount of rubbing surface presented by the core and shell upon each other, a comparatively slight effort is required to bring them into contact with sufficient force to stop the cars, and this being applied by the joint action of the lever and the pivoted links, an immediate stop of the car can be made with but little effort on the part of the brakeman.

It will be observed that the brace G', connecting the front and hind core and axles to each other, consists of two rods crossing each other, as shown in fig. 5.

This form of connection serves as a brace, whereby greater strength is obtained, in order to prevent the core from revolving; then, by the employment of a brace, constructed as G, in fig. 2, instead of a core and shell constructed as above described, a pair of plain disks may be used; and though, perhaps, less efficient than the core, it can be applied with good results without departing from the principle of my invention.

What I claim as my improvement, and desire to secure by Letters Patent, is—

The shell D, core E, and braces G G', in combination with the links J L, bail K, yoke H, and collars I I', when constructed and arranged substantially as and for the purpose set forth.

AARON HIGLEY.

Witnesses:
J. H. BURRIDGE,
D. L. HUMPHREY.